United States Patent
Gouk et al.

(10) Patent No.: US 8,673,162 B2
(45) Date of Patent: Mar. 18, 2014

(54) METHODS FOR SUBSTRATE SURFACE PLANARIZATION DURING MAGNETIC PATTERNING BY PLASMA IMMERSION ION IMPLANTATION

(75) Inventors: Roman Gouk, San Jose, CA (US); Steven Verhaverbeke, San Francisco, CA (US); Matthew D. Scotney-Castle, Morgan Hill, CA (US); Martin A. Hilkene, Gilroy, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 12/965,318

(22) Filed: Dec. 10, 2010

(65) Prior Publication Data

US 2011/0143170 A1 Jun. 16, 2011

Related U.S. Application Data

(60) Provisional application No. 61/285,481, filed on Dec. 10, 2009.

(51) Int. Cl.
*B44C 1/22* (2006.01)
*H01L 21/00* (2006.01)
*B32B 9/00* (2006.01)

(52) U.S. Cl.
USPC ............... 216/22; 216/67; 438/706; 428/846

(58) Field of Classification Search
USPC ............. 428/846, 846.2, 846.9, 846.3, 847.1, 428/848.1, 827, 822, 831, 832, 800; 438/398, 725, 458, 531, 134, 514, 510, 438/780, 738, 694, 710, 704, 706, 689, 3, 438/712.2; 257/532; 427/127, 162, 130, 427/259, 248.1, 526; 216/51, 38, 67, 22; 156/361, 345.37, 345.33; 134/4; 360/48; 430/329

See application file for complete search history.

(56) References Cited

U.S. PATENT DOCUMENTS

| | | | |
|---|---|---|---|
| 4,863,809 A | 9/1989 | Brar et al. | |
| 7,288,491 B2 * | 10/2007 | Collins et al. | 438/783 |
| 7,291,545 B2 * | 11/2007 | Collins et al. | 156/345.37 |
| 2001/0042598 A1 * | 11/2001 | Yamada et al. | 156/362 |
| 2002/0142192 A1 * | 10/2002 | Kamata et al. | 428/832 |
| 2002/0151156 A1 * | 10/2002 | Hallock et al. | 438/531 |
| 2003/0104316 A1 * | 6/2003 | Wang et al. | 427/526 |
| 2004/0164293 A1 * | 8/2004 | Maloney et al. | 257/40 |
| 2006/0222898 A1 * | 10/2006 | Ichihara | 427/127 |
| 2007/0003798 A1 * | 1/2007 | Naito et al. | 428/846.2 |
| 2008/0268288 A1 * | 10/2008 | Jin | 216/51 |
| 2009/0115028 A1 * | 5/2009 | Shimomura et al. | 438/458 |
| 2009/0201722 A1 * | 8/2009 | Giridhar et al. | 365/173 |
| 2009/0230508 A1 * | 9/2009 | Dyer et al. | 438/391 |
| 2010/0221583 A1 * | 9/2010 | Foad et al. | 118/728 |
| 2010/0261040 A1 * | 10/2010 | Foad et al. | 428/800 |
| 2012/0223948 A1 | 9/2012 | Noh et al. | |

* cited by examiner

*Primary Examiner* — Kevin M. Bernatz
*Assistant Examiner* — Louis Falasco
(74) *Attorney, Agent, or Firm* — Patterson & Sheridan, LLP (57) ABSTRACT

A method and apparatus for planarizing magnetically susceptible layers of substrates is provided. A patterned resist is formed on the magnetically susceptible layer, and the substrate is subjected to a plasma immersion ion implantation process to change a magnetic property of the magnetically susceptible layer according to the pattern of the resist material. The substrate is subjected to a plasma material removal process either before or after the implantation process to planarize the surface of the magnetically susceptible layer resulting from the implantation process. The plasma material removal process may be directional or non-directional.

10 Claims, 4 Drawing Sheets

METHODS FOR SUBSTRATE SURFACE PLANARIZATION DURING MAGNETIC PATTERNING BY PLASMA IMMERSION ION IMPLANTATION

CROSS-REFERENCE TO RELATED APPLICATIONS

This application claims benefit of U. S. provisional patent application Ser. No. 61/285,481, filed Dec. 10, 2009, which is herein incorporated by reference.

BACKGROUND OF THE INVENTION

1. Field of the Invention

Embodiments described herein generally relate to processing of magnetically susceptible substrates for magnetic media. More specifically, embodiments described herein relate to producing magnetic media having a pattern of magnetic characteristics.

2. Description of the Related Art

Magnetic media are used in various electronic devices such as hard disk drives and magnetoresistive random access memory (MRAM) devices. Hard-disk drives are the storage medium of choice for computers and related devices. They are found in most desktop and laptop computers, and may also be found in a number of consumer electronic devices, such as media recorders and players, and instruments for collecting and recording data. Hard-disk drives are also deployed in arrays for network storage. MRAM devices are used in various non-volatile memory devices, such as flash drives and dynamic random access memory (DRAM) devices.

Magnetic media devices store and retrieve information using magnetic fields. The disk in a hard-disk drive is configured with magnetic domains that are separately addressable by a magnetic head. The magnetic head moves into proximity with a magnetic domain and alters the magnetic properties of the domain to record information. To recover the recorded information, the magnetic head moves into proximity with the domain and detects the magnetic properties of the domain. The magnetic properties of the domain are generally interpreted as corresponding to one of two possible states, the "0" state and the "1" state. In this way, digital information may be recorded on the magnetic medium and recovered thereafter.

Magnetic storage media generally comprise a glass, composite glass/ceramic, or metal substrate, which is generally non-magnetic, with a magnetically susceptible material between about 100 nm and about 1 µm thick deposited thereon by a PVD or CVD process. A magnetically susceptible material is any material that has magnetic characteristics that change in the presence of an applied magnetic field. A layer comprising cobalt and platinum is typically sputter deposited on a structural substrate to form a magnetically susceptible layer. The magnetically susceptible layer is generally either deposited to form a pattern or patterned after deposition, such that the surface of the device has areas of magnetic susceptibility interspersed with areas of relative magnetic inactivity or impermeability. By one method, the non-magnetic substrate is topographically patterned, and the magnetically susceptible material deposited by spin-coating or electroplating. The disk may then be polished or planarized to expose the non-magnetic boundaries around the magnetic domains. In some cases, the magnetic material is deposited in a patterned way to form magnetic grains or dots separated by a non-magnetic area.

Such methods are expected to yield storage structures capable of supporting data density up to about 1 TB/in$^2$, with individual domains having dimensions as small as 20 nm. Where domains with different spin orientations meet, there is a region referred to as a Bloch wall in which the spin orientation goes through a transition from the first orientation to the second. The width of this transition region limits the two-dimensional density of information storage because the Bloch wall occupies an increasing portion of the total magnetic domain.

To overcome the limit due to Bloch wall width in continuous magnetic thin films, the domains can be physically separated by a non-magnetic region (which can be narrower than the width of a Bloch wall in a continuous magnetic thin film). Conventional approaches to creating discrete magnetic and non-magnetic areas on a medium have focused on forming single bit magnetic domains that are completely separate from each other, either by depositing the magnetic domains as separate islands or by removing material from a continuous magnetic film to physically separate the magnetic domains. A substrate may be masked and patterned, and a magnetic material deposited over exposed portions, or the magnetic material may be deposited before masking and patterning, and then etched away in exposed portions. In either case, the topography of the substrate is altered by the residual pattern of the magnetic regions. Because the read-write head of a typical hard-disk drive may fly as close as 2 nm from the surface of the disk, these topographic alterations may have limited future use due to roughness such methods impart to the surface of the disk. Thus, there is a need for a process or method of patterning magnetic media that has high resolution and does not alter the topography of the media, and an apparatus for performing the process or method efficiently for high volume manufacturing.

SUMMARY OF THE INVENTION

Embodiments described herein provide a method of processing a substrate having a magnetic surface covered by a layer of patterned resist, the layer of patterned resist comprising thin areas and thick areas, the method comprising removing material from the substrate surface in the areas of thin resist material by exposing the substrate to a material-removing plasma, implanting ions into the substrate surface in the areas of thin resist material by subjecting the substrate to a plasma ion immersion implantation process, and removing the resist material by subjecting the substrate to a plasma resist removal process.

Other embodiments provide a substrate having a magnetically susceptible surface with a magnetic characteristic, the magnetically susceptible surface comprising a first region and a second region, wherein the first region has a first value of the magnetic characteristic and the second region has a second value of the magnetic characteristic, and wherein the second region has atoms of one or more elements implanted therein by a plasma ion immersion implantation process, at least one of the first region and the second region has a critical dimension less than about 50 nm, and the magnetically susceptible surface has average surface roughness less than about 20 Angstroms.

Other embodiments provide an apparatus for processing a substrate having a magnetically susceptible surface, the apparatus comprising a chamber, a substrate support having multiple substrate sites disposed in the chamber, a gas distributor facing the substrate support, a bias generator coupled to the substrate support, the gas distributor, or both, a plasma source, and an implantation precursor source, a resist removal process gas source, and a substrate smoothing process gas source coupled to the chamber.

BRIEF DESCRIPTION OF THE DRAWINGS

So that the manner in which the above-recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
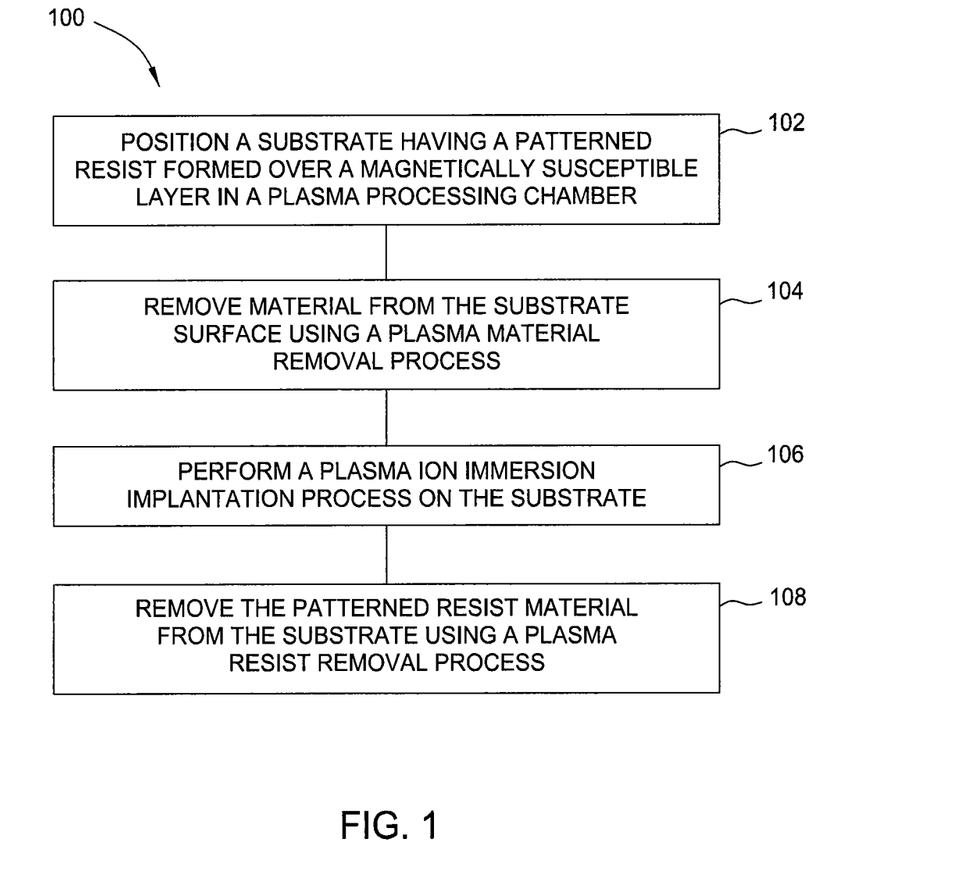
FIG. 1 is a flow diagram summarizing a method according to one embodiment.

FIG. 1 is a flow diagram summarizing a method 100 according to one embodiment. The method 100 is generally useful for processing substrates having magnetically susceptible surfaces and for forming a pattern of magnetic properties in such magnetically susceptible surfaces. The substrates produced by the method 100 generally have regions with different magnetic properties formed in the magnetically susceptible surface, the regions having critical dimensions less than about 50 nm.

A substrate having a magnetically susceptible layer with a patterned resist material formed thereon is positioned in a plasma processing chamber at 102. The magnetically susceptible layer is generally formed from one or more ferromagnetic materials. In some embodiments, the magnetically susceptible layer comprises a plurality of layers having the same or different composition. In some embodiments, two layers are formed, a first with low magnetic coercivity, and a second with higher coercivity. The first layer may comprise iron, nickel, platinum, or combinations thereof, and may itself be formed as a plurality of sub-layers. The second layer may comprise cobalt, chromium, platinum, tantalum, iron, terbium, gadolinium, or combinations thereof, and may also be formed as a plurality of sub-layers. In one embodiment of a magnetically susceptible layer, a first layer comprising iron or iron/nickel alloy is formed with a thickness between about 100 nm and about 1,000 nm (1 μm) and a second layer comprising chromium, cobalt, platinum or combinations thereof, is formed with a thickness between about 30 nm and about 70 nm, such as about 50 nm. The layers may be formed by any suitable method, such as physical vapor deposition, or sputtering, chemical vapor deposition, plasma-enhanced chemical vapor deposition, spin-coating, plating by electrochemical or electroless means, and the like.

The magnetically susceptible layer is formed on a structural substrate that is magnetically impermeable with diamagnetic, or only weak paramagnetic, properties. The substrate material is usually dielectric and adheres well to the magnetically susceptible layer. In some embodiments, the magnetic susceptibility of the structural substrate is below about $10^{-4}$. The structural substrate may comprise metal, metal alloy, glass, ceramic, or combinations thereof.

The patterned resist is generally formed by applying a resist material to the substrate and then forming a pattern in the resist material, generally by photolithography or nanoimprint lithography. The pattern may result in openings through the resist material that expose portions of the magnetically susceptible layer underneath, or in varying thicknesses of the resist material across the substrate surface. The pattern of the resist material defines masked portions and unmasked portions of the substrate and the magnetically susceptible surface thereof. The unmasked portions will be susceptible to contact with ions, either directly or through the thin resist material, and the masked portions will be protected from contact with ions, as further described below.

A physical or photochemical process may be used to pattern the resist. In one embodiment, photolithography may be used to pattern the resist. In another embodiment, nanoimprint lithography may be used. In a nanoimprint lithography process, the resist material may be a curable material that accepts a physical pattern before curing and retains the pattern after curing. In one such embodiment, an epoxy-like compound is applied to a substrate and a pattern transferred to the epoxy-like compound by a stamp. The epoxy-like compound may be partially cured before the stamp is removed to ensure the pattern is retained in the epoxy-like material, and then completely cured after the stamp is removed. In an alternate nanoimprint lithography embodiment, the epoxy-like compound is applied to a pattern template, partially or completely cured, and then transferred and applied to the substrate. A nanoimprint process may be performed using one of the IMPRIO® or J-FIL™ products available from Molecular Imprints, Inc., of Austin, Tex.

Material is removed from the substrate surface using a plasma material removal process at 104. The material removal of operation 104 compensates for swell, or volume growth, resulting from the plasma ion immersion implantation operation 106 described further below, which may be performed before or after the material removal operation 104. The material removal operation 104 may be a physical removal process or a chemical removal process, or a combination thereof. In one embodiment, material may be sputtered from the substrate surface such that the unmasked portions of the magnetically susceptible layer are sputtered but the masked portions are not. In another embodiment, material may be etched from the substrate surface subject to similar constraints.

A sputtering operation may remove material from the substrate by providing an inert gas to the chamber containing the substrate, and forming a plasma from the inert gas. The plasma may be initiated remotely or in situ by any suitable electromagnetic means, such as a capacitatively coupled DC, AC, or RF powered electric field, an inductively coupled DC, AC, or RF powered magnetic field, or microwave or UV radiation, any of which may be pulsed. In one embodiment, an inductively generated oscillating magnetic field powered by RF power is applied to the inert gas. Ions in the plasma are then directed toward the substrate using an electrical bias applied to the substrate support or a chamber surface facing the substrate support. The electrical bias may be generated by DC, AC, or RF power, any of which may be pulsed. In one embodiment, the plasma sputtering process may be a plasma immersion sputtering process.

The ions impact the substrate surface, dislodging material from the surface. Oriented in a given reference frame, the substrate with the patterned resist has surfaces that may be termed horizontal, substantially parallel to a plane defined by the magnetically susceptible surface of the substrate, and surfaces that may be termed vertical, substantially perpendicular to the horizontal surfaces. The accelerated ions generally impact the horizontal surfaces of the patterned resist and, if exposed, the horizontal surfaces of the substrate in the unmasked portions of the magnetically susceptible surface. If the unmasked portions of the magnetically susceptible surface of the substrate are covered with thin layers of resist material, the ions in a sputtering process remove the resist before impacting the magnetically susceptible surface. In most embodiments, the thickness of the resist layer is uniformly reduced by the sputtering process, and material is removed from the magnetically susceptible layer in the unmasked portions.

In one embodiment, a substrate is disposed on a substrate support in a plasma processing chamber having a gas distributor facing the substrate support. The substrate comprises a magnetically susceptible layer having a thickness between about 10 nm and about 500 nm, with a resist layer thereon having a thickness between about 10 nm and about 100 nm. The magnetically susceptible layer generally comprises magnetically active materials as described above, and the resist material comprises carbon. The resist layer may have a pattern, wherein thick portions of the resist layer have a thickness between about 50 nm and about 100 nm, and thin portions of the resist layer have a thickness between about 0 nm (i.e. the magnetically susceptible layer is exposed) and about 10 nm. RF power between about 100 W and about 10 kW is applied through an impedance matching network and a high- or low-pass filter to the substrate support at a frequency of 13.56 MHz to generate a bias voltage between about 100 V and about 10 kV on the substrate support. The ion energy necessary for the sputtering operation depends on the thickness and relative density of the resist material, and on the available exposure time. An inert gas comprising argon or helium, or a combination thereof, is provided at a flow rate between about 100 sccm and about 10,000 sccm, depending on the chamber volume. The chamber pressure is maintained between about 1 Torr and about 10 Torr.

The substrate is exposed to the ions for a time period sufficient to remove a thin surface layer, such as between about 1 nm and about 5 nm, of magnetic material after removing any resist material covering the unmasked portions. In one aspect, the substrate is exposed to the ions for between about 1 second and about 60 seconds, such as between about 10 seconds and about 30 seconds, or between about 15 seconds and about 25 seconds, for example about 20 seconds.

In one embodiment, a gas mixture comprising argon and helium is used to sputter material from the substrate surface. The gas mixture is provided to the chamber at a flow rate, expressed as a function of chamber volume, between about 2 sccm/L and about 25 sccm/L, for example between about 2.5 sccm/L and about 15 sccm/L. The ratio of argon to helium will influence the rate of sputtering, due to the relative size and mass of argon and helium ions. A higher ratio of argon to helium will sputter faster. A volumetric ratio of argon to helium between about 1% and about 80%, such as between about 10% and about 50%, for example less than about 50%, may be used.

The argon/helium sputtering embodiment described above is one example of a directional material removal process that may be performed at 104. A directional material removal process, such as the argon/helium sputtering process described above, selectively removes material from certain surfaces of the substrate, such as the horizontal surfaces, without substantial impact on other surfaces, such as vertical surfaces. In some embodiments, a directional material removal process may be advantageous for removing material from the horizontal surfaces of the substrate and the resist layer while affecting vertical surfaces relatively little. Such a directional material removal process may be advantageous, for example, if performed before a process to change the magnetic properties of the magnetically susceptible layer in the unmasked areas because the critical dimension of the resist pattern is largely preserved through the material removal process.

Material may also be removed at 104 by an etching process such as reactive ion etching. An etchant may be provided to the chamber in place of the inert gas above. The etchant may be ionized into a plasma using RF power, as described above, and the ions allowed to contact the substrate. In one respect, the ions may be accelerated toward the substrate to penetrate, sputter, or etch any thin resist layer covering the unmasked portions of the substrate. In general, an etching process is performed using an etchant that will react chemically with the substrate to be etched. Because the magnetically susceptible layer is metal, an etchant is generally selected that will react with and remove metal. Such etchants may include electron acceptor species, such as halogens. In one respect, hydrogen halides such as HCl or HF may be used to remove metal from the magnetically susceptible layer. The etchant may be provided with a carrier gas, which may be an inert gas such as argon, helium, or nitrogen.

In one embodiment, an etching precursor is provided to a process chamber containing a substrate to be processed. The substrate may have a magnetically susceptible layer and patterned resist, as described above. The etching precursor may be provided to the chamber at a flow rate, depending on the chamber volume, between about 100 sccm and about 10,000 sccm, or normalized to chamber volume between about 5 sccm/L and about 500 sccm/L. The etching precursor generally comprises one or more etchants, such as halogen containing components, and one or more inert or non-reactive components, such as nitrogen gas, argon, or helium. The halogen containing components may be selected from the group consisting of elemental halogen gases, hydrogen halides, carbon halides, silicon halides, nitrogen halides, and volatile halo-organic compounds. Exemplary etchants include, but are not necessarily limited to $Cl_2$, $F_2$, HCl, HF, $CCl_4$, $CHCl_3$, $CHCF_3$, $CH_2Cl_2$, $CH_2F_2$, $SiF_4$, and $NF_3$. The etchants may be provided with a co-etchant comprising hydrogen, oxygen, or nitrogen. Some exemplary co-etchants include water, oxygen gas, nitrogen gas, and hydrogen gas.

The etchant is ionized into a plasma using any suitable means for generating a plasma, including exposure to electromagnetic energy in the form of a capacitative electric field generated using DC, AC, or RF power, an inductive magnetic field generated using DC, AC, or RF power, or UV or microwave radiation, any of which may be pulsed. Reactive ions from the plasma, including ions of fluorine and chlorine, react with metals of the magnetically susceptible layer and remove a portion of the layer. Contact between the ions and the substrate may be encouraged by biasing the substrate using a DC, AC, or RF bias, which may be pulsed, and may be applied to the substrate support or chamber components facing the substrate support, such as the gas distributor or chamber wall or lid. Chamber conditions and substrate bias may be similar to those described above in connection with the inert gas material removal process.

An etching process may be followed by a hydrogen plasma exposure or by exposure to an inert gas plasma to remove any residual halogen species that may remain on the substrate surface. A hydrogen plasma will scavenge any remaining halogen from the surface by reacting with halogens chemically to produce volatile species. An inert gas plasma will sputter any residual halogen from the surface in a manner similar to that described above. In some embodiments, a mixture of hydrogen and inert gas plasma may be used. The hydrogen or inert gas plasma treatment may be performed after a purge step in which the plasma is deactivated, or the plasma may be continued as flow of the etchant is replaced by flow of the hydrogen or inert gas.

In the material removal processes described above, the substrate is maintained at a temperature below about 150° C., such as between about 50° C. and about 100° C. or between about 0° C. and about 50° C., for example about 25° C. Temperatures above about 150° C. risk damaging the magnetic properties of the substrate. The substrate support is generally temperature controlled using either a resistive element for adding heat or a thermal exchange fluid for adding or removing heat. The plasma processes described above may increase the temperature of the substrate due to the energy of collision between the ions and the substrate.

In some embodiments, ion treatment may be intermittent to allow for cooling the substrate during the process. In the sputtering example above, the electrical bias, plasma generation, or both may be switched off intermittently, or even pulsed, to interrupt the ion bombardment, allowing the substrate support temperature control to remove heat from the substrate. Alternately, the plasma source may be de-energized, and the inert gas allowed to flow through the chamber and cool the substrate. For example, in one embodiment, ion bombardment may be performed in cycles wherein the substrate is bombarded with ions for a time between about 1 sec. and about 10 sec., and then plasma energy is discontinued for a time between about 1 sec. and about 5 sec. Flow of the inert gas is continued while plasma energy is switched off such that the inert gas removes heat from the substrate. In another embodiment, inert gas ion bombardment may be performed between two inert gas purge operations by establishing flow of an inert gas for a first duration, forming a plasma from the inert gas for a second duration, and discontinuing the plasma for a third duration. Each of the first, second, and third durations will generally be between about 1 sec. and about 30 sec. The inert gas flow during the first duration will pre-cool the substrate, if desired, before the ion bombardment heats the substrate. The second duration removes material from the substrate, and the third duration cools the substrate. Use of an etching process may avoid increasing the temperature of the substrate because the etching process may be accomplished without stimulating energetic collisions between ions and substrate (ie. low bias or weak bias).

In another embodiment of a material removal process, a non-directional process may be used. In one example, nitrogen gas may be used to sputter horizontal and vertical surfaces of the substrate, including the patterned resist material. Chamber conditions and flow rates for a nitrogen gas sputtering operation are generally similar to those described above, as are sputtering durations, and thermal control options. Nitrogen gas may be provided in a gas mixture with a carrier such as argon or helium to control the material removal rate and temperature rise. Though not wishing to be bound by theory, it is thought that ionized nitrogen gas is more reactive than ionized argon atoms, and, whereas argon ions will generally not react chemically with the carbon of the resist material in the vertical surfaces, the nitrogen ions will react chemically to etch the carbon walls of the resist material.

A plasma ion immersion implantation process is performed on the substrate at 106. The plasma ion immersion implantation process exposes the substrate to ions from a plasma. The ions implant into the unmasked portions of the substrate surface, altering one or more magnetic characteristics of the surface in the unmasked portions. The plasma may be formed by any suitable process of forming a plasma. In one embodiment, the plasma is formed by exposing a process gas to an inductively-generated alternating magnetic field. The process gas is allowed to flow through a passage adjacent to a process chamber, and an inductive core is disposed about the passage. RF power is coupled to the inductive core to create the magnetic field inside the passage. The magnetic field excites atoms and molecules in the process gas into ions, which flow into the process chamber to form the plasma. In other embodiments, the plasma may be formed by exposing the process gas to any suitable form of electromagnetic energy, including a capacitatively-generated electric field, which may be DC, AC, or pulsed, an inductively-generated magnetic field, which may be DC, AC, or pulsed, electromagnetic radiation such as UV or microwave radiation, or a mixture thereof. In all cases, the plasma source may be remote or in situ.

Ions of helium, hydrogen, oxygen, nitrogen, boron, phosphorus, arsenic, fluorine, silicon, platinum, aluminum, chlorine, or argon may be used to alter the magnetic properties of a substrate surface. In one embodiment, a halogen containing gas such as $BF_3$ is provided to the process chamber in a process gas that may comprise one or more precursors and one or more carrier gases. A hydrogen containing gas such as $CH_4$ may also be included as one of the precursors. The carrier gas may be argon or helium in some embodiments. The process gas may be provided to the chamber at a flow rate between about 10 sccm and about 1,000 sccm, wherein the halogen containing gas is provided at a flow rate between about 10 sccm and about 500 sccm and the hydrogen containing gas is provided at a flow rate between about 5 sccm and about 350 sccm. The chamber is generally maintained at a pressure less than about 100 mTorr, and the plasma is generated by applying power between about 50 W and about 5,000 W through one or more of the electromagnetic means discussed above. The ions are accelerated toward the substrate by an electrical bias, which may be applied to the substrate support or any chamber component facing the substrate support, such as a gas distributor or chamber wall. The bias may be DC, pulsed DC, or RF, and may be between about 50 V and about 500 V.

Implanting ions in the substrate surface causes volumetric growth or swelling of the implanted area. The volume implanted generally swells by between about 10% and about 30%. Thus, in a circular area of diameter 50 nm, implanting atoms to a depth of between about 10 nm and about 20 nm to an average dose of about $2.5 \times 10^{16}$ $cm^{-3}$ will generally result in surface rise of between about 1 nm and about 5 nm. If material is removed from the surface prior to implantation to a depth approximately equal to the expected swell, the substrate will be approximately smooth, with low surface roughness, following the implantation. If material is removed after the implantation, an implanted region approximately 10-20 nm deep will remain, and the substrate will be approximately smooth. The above dimensions naturally depend on the critical dimension of the implanted area and the depth and concentration of implantation.

The material removal operation of 104, which may be a smoothing process, may be performed before or after the plasma ion immersion implantation operation of 106. FIGS. 2A-2D are schematic cross-sectional views of a substrate at various stages of the method 100 of FIG. 1 according to one embodiment. In the embodiment of FIGS. 2A-2D, the material removal operation is performed before the plasma ion immersion implantation operation. If the material removal operation is performed before the implantation operation, the concentration profile of the implanted species has a maximum a few Angstroms below the substrate surface, with a lower concentration on the surface. If the material removal operation is performed after the implantation operation, the maximum concentration of implanted species is at the surface of the substrate. This difference may be important during subsequent processing regimes that may be sensitive to, or may promote, degassing of the implanted species.

At 108, the resist is removed from the substrate using a plasma resist removal process. The plasma resist removal process may be an ashing process, in some embodiments. A reactive plasma is formed from a halogen containing compound and an oxygen containing compound. The halogen containing compound may be any of those listed above in connection with the material removal process 104. The oxygen containing compound may be oxygen gas, water, nitrous oxide, ozone, carbon dioxide, carbon monoxide, or another oxygen containing gas. In some embodiments, hydrogen or nitrogen gas may be provided as a carrier gas. In one embodiment, the same components may be used in the material removal process 104 and the plasma resist removal process 108. In one embodiment, the material removal process and the plasma resist removal process are performed under continuous plasma conditions. The composition of the gas mixture used to form the plasma may be adjusted to selectively remove the metal magnetically susceptible material or the carbon containing resist material. For example, the gas mixture may be halogen rich to selectively remove the metal of the magnetically susceptible layer, and may be adjusted to be oxygen rich to selectively remove the resist material.

Figure 2A:
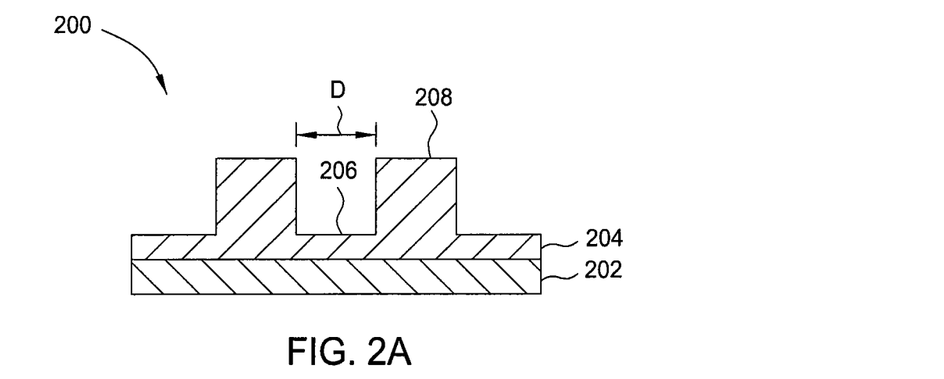
FIGS. 2A-2D are schematic cross-sectional views of a substrate at various stages of the method of FIG. 1 according to one embodiment.

In FIG. 2A, a substrate 200 having a magnetically susceptible layer 202 and a resist layer 204 is ready for processing. The layers of the substrate generally conform to the description of such layers given above. The resist layer 204 defines masked areas 208 and unmasked areas 206 of the substrate 200. In the embodiment of FIG. 2A, the unmasked areas 206 are covered by a thin layer of resist material. In other embodiments, the unmasked areas 206 may comprise exposed portions of the magnetically susceptible layer 202. Whether exposed or covered by a thin layer of resist, the unmasked areas 206 allow a processing regime to contact and process the areas of the magnetically susceptible layer 202 beneath the unmasked areas 206, while the masked areas 208 are protected from the process regime by a thick resist layer. In some embodiments, the resist layer 204 will have thick portions having a first thickness and thin portions having a second thickness, wherein a ratio of the first thickness to the second thickness is between about 1.3 and about 1.8, or between about 1.4 and about 1.7, such as between about 1.5 and about 1.6.

Figure 2B:
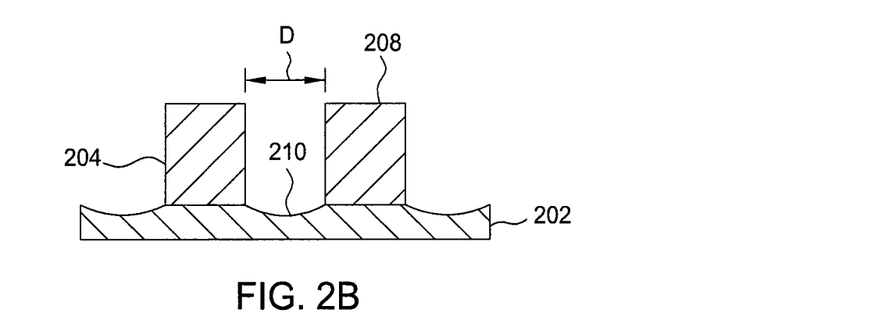
Figure 2C:
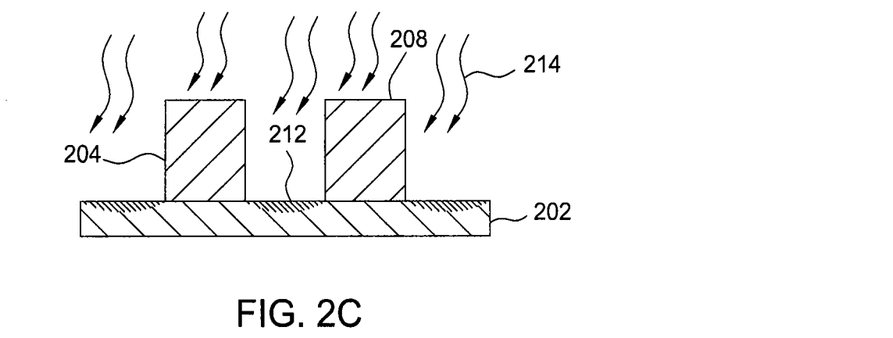
Figure 2D:
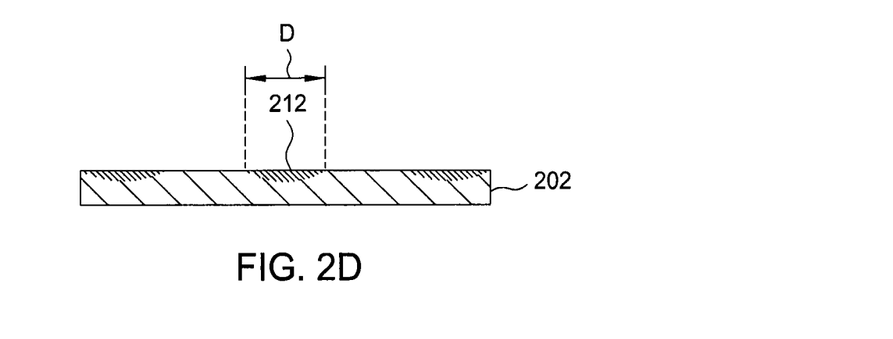

The unmasked area 206 defines a critical dimension D that determines the dimension of domains 212 on the surface of the magnetically susceptible layer 202 that have one or more altered magnetic properties, shown in FIG. 2D. In FIG. 2B, the substrate 200 has been subjected to a material removal process, such as the material removal operation 104 of FIG. 1. The thin layer of resist over the unmasked areas 206 has been removed, along with a portion of the underlying magnetically susceptible layer 202, to form slight depressions 210 between the masked portions 208. The depressions 210 are generally concave areas formed in the magnetically susceptible layer 202 between the masked areas 208. In the embodiment of FIG. 2B, the critical dimension D has not been substantially affected by the material removal process, indicating a directional process was used. A directional material removal process, such as the inert gas sputtering operation described above, mainly removes material from horizontal surfaces, creating the depressions 210 and reducing the thickness of the resist layer 204 of the masked areas 208, leaving the critical dimension D unaltered. The inert gas sputtering operation described above is directional because argon does not substantially sputter the vertical surfaces of the resist material.

In FIG. 2C, the substrate 200 is exposed to a plasma 214 in a plasma immersion ion implantation process. The plasma contacts the thick portions of the resist layer at the masked areas 208, and the magnetically susceptible layer 202 at the unmasked areas, forming implanted areas in the domains 212 exposed at the unmasked areas. Implantation of ions in the domains 212 causes growth in volume of the implanted areas due to the extra mass contained therein. The former depressions 210 are substantially leveled by the implant swell, resulting in implanted domains 212 that may range from slightly concave to slightly convex.

In FIG. 2D, the resist layer 204 remaining in FIG. 2C has been removed by a plasma resist removal process, which may be a stripping process or an ashing process. The resulting substrate has a magnetically susceptible layer 202 with domains 212 having one or more altered magnetic characteristics. The domains 212 have a dimension that conforms to the critical dimension D, which may be less than about 50 nm, such as between about 5 nm and about 30 nm, for example between about 10 nm and about 20 nm. The domains generally have a depth between about 5 nm to about 50 nm, and may extend through the thickness of the entire magnetically susceptible layer 202.

Figure 3A:
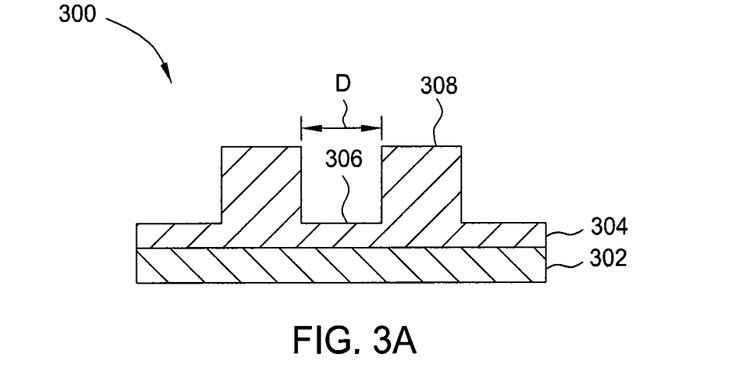
FIGS. 3A-3D are schematic cross-sectional views of a substrate at various stages of the method of FIG. 1 according to another embodiment.

FIGS. 3A-3D are schematic cross-sectional views of a substrate 300 at various stages of the method 100 of FIG. 1 according to another embodiment. In FIG. 3A, the substrate 300 is shown with a magnetically susceptible layer 302 and a patterned resist layer 304 that defines unmasked areas 306 having a thin resist layer thereon and masked areas 308 having a thick resist layer thereon.

Figure 3B:
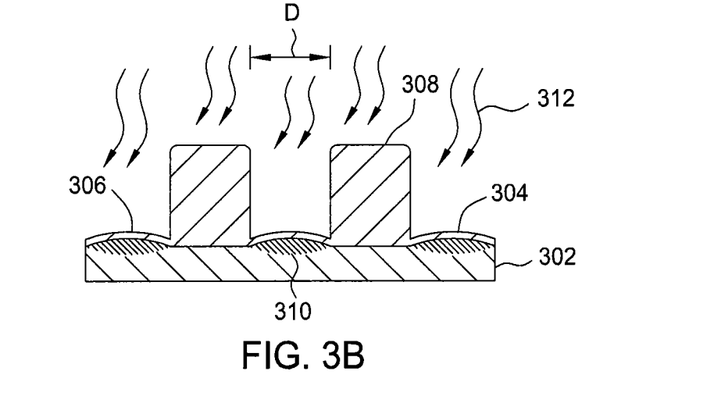

In FIG. 3B, the substrate 300 has been subjected to a plasma immersion ion implantation process by exposing the substrate 300 to a plasma 312 to form implanted regions 310 having atoms implanted into the magnetically susceptible layer 302 in the unmasked areas 306. The plasma process has thinned the layer of resist in the unmasked areas 306 and the masked areas 308. In one embodiment, halogen atoms such as fluorine or chlorine are incorporated into the magnetically susceptible layer during the plasma process. The halogen atoms will generally be implanted with a concentration profile that varies with depth. In one example, implanted atoms will reach a maximum concentration near the surface of the magnetically susceptible layer 302, at an exemplary depth within the layer between about 0 Angstroms and about 100 Angstroms. The concentration of implanted atoms will generally decline with depth at a rate between about 1 dec./nm. and about 10 dec./nm. in most embodiments.

The implanted atoms, which may be halogen atoms in some embodiments, change at least one magnetic property of the magnetically susceptible layer 302 into which they implant. In one embodiment, the magnetic coercivity, or the resistance of a ferromagnetic material to being demagnetized, in the implanted regions 310 is reduced, destroyed, or even increased, depending on the implanted species. In another embodiment, the saturation magnetization, the maximum magnetization a material can undergo, is reduced or destroyed. In another embodiment, the magnetic permeability is reduced or destroyed. The implanted atoms generally change at least one magnetic property by a detectable magnitude. In some embodiments, one or more of the magnetic properties listed above is reduced by between about 10% and about 100%, such as between about 50% and about 80%.

The critical dimension D of the resist pattern determines the sizes of the domains of different magnetic properties. With patterning processes capable of forming resist features having critical dimension of 50 nm or less, neighboring domains having dimension of about 50 nm or less, such as between about 1 nm and about 50 nm, or between about 5 nm and about 20 nm, for example about 10 nm or less, may be formed having detectably different magnetic properties, leading to sizeable gains in storage density.

Figure 3C:
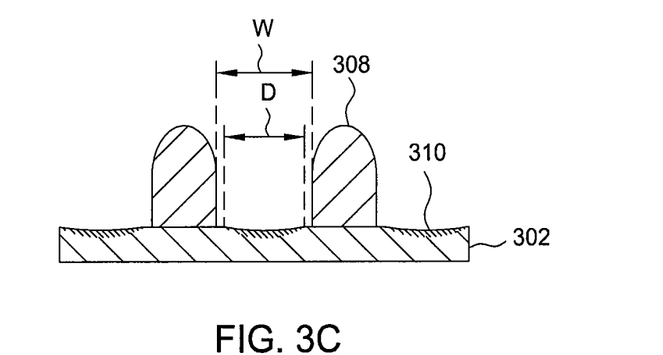

In FIG. 3C, the substrate 300 is shown having undergone a plasma material removal process such as one of the processes described in connection with operation 104 of FIG. 1. The swell in the implanted regions 310 has been removed, along with much of the patterned resist 304, indicating the process used for material removal was a non-directional process, as described above. The non-directional material removal process increased a distance between the vertical walls of the patterned resist from the critical dimension D to a width W>D. Removal of some resist material during the material removal process may be advantageous in some embodiments because subsequent processes for removing resist material from the substrate may be shortened.

Figure 3D:
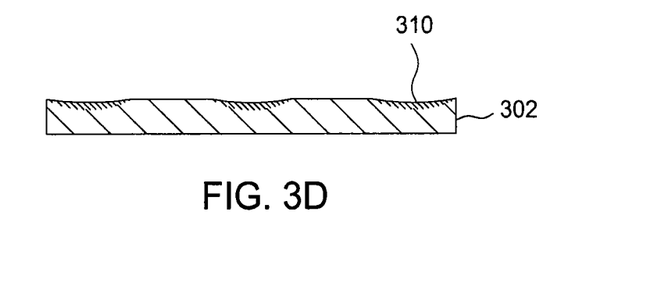

In FIG. 3D, the resist material has been removed by a plasma resist removal process as described above. The remaining surface of the magnetically susceptible layer 302 is left with the implanted regions 310 having different magnetic properties from the masked areas 308, and an average surface roughness $R_a$ of about 20 Angstroms or less, such as between about 5 Angstroms and about 15 Angstroms.

Figure 4:
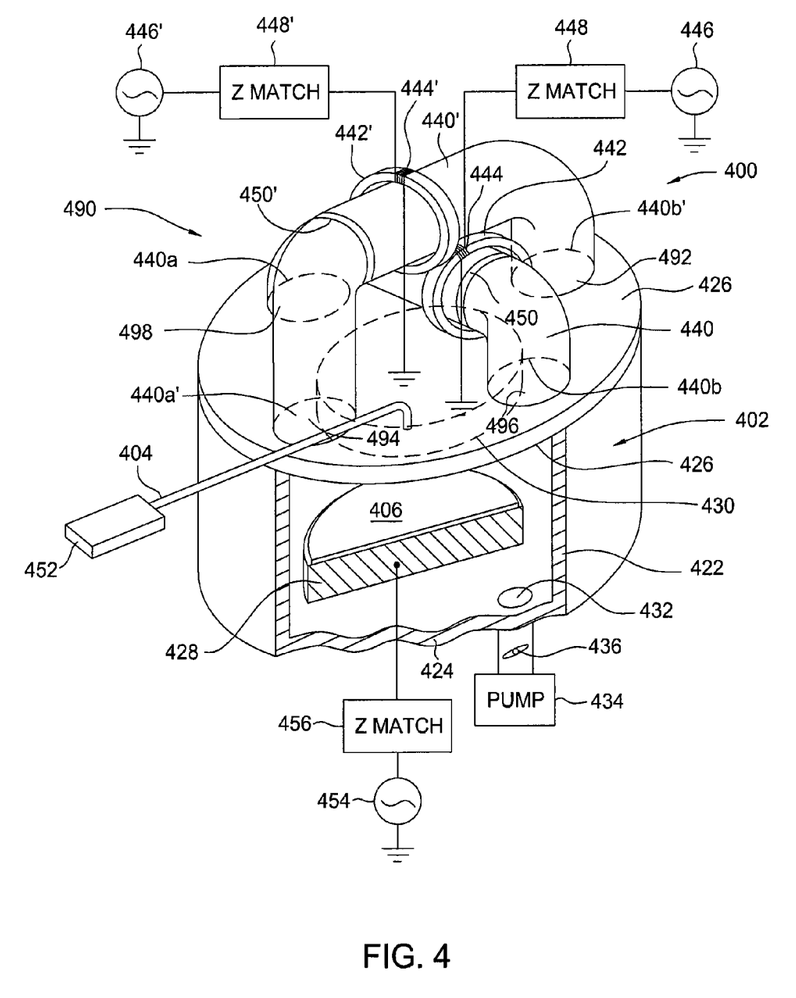
FIG. 4 is an isometric view of an apparatus for processing magnetically susceptible substrates according to another embodiment.

FIG. 4 is an isometric drawing of a chamber useful for practicing embodiments described herein. One example of such a chamber is the P3I™ chamber available from Applied Materials, Inc., of Santa Clara, Calif. The chamber of FIG. 4 is useful for performing plasma immersion ion implantation procedures, but may also be used to shower a substrate with energetic ions without implanting. The processing chamber 400 includes a chamber body 402 having a bottom 424, a top 426, and side walls 422 enclosing a process region 404. A substrate support assembly 428 is supported from the bottom 424 of the chamber body 402 and is adapted to receive one or more substrates 406 for processing. A gas distribution plate 430 is coupled to the top 426 of the chamber body 402 facing the substrate support assembly 428. A pumping port 432 is defined in the chamber body 402 and coupled to a vacuum pump 434. The vacuum pump 434 is coupled through a throttle valve 436 to the pumping port 432. A process gas source 452 is coupled to the gas distribution plate 430 to supply gaseous precursor compounds for processes performed on the substrate 406.

The chamber 400 depicted in FIG. 4 further includes a plasma source 490. The plasma source 490 includes a pair of separate external reentrant conduits 440, 440' mounted on the outside of the top 426 of the chamber body 402 disposed transverse to one another or orthogonal to one another. The first external conduit 440 has a first end 440a coupled through an opening 498 formed in the top 426 into a first side of the process region 404 in the chamber body 402. A second end 440b has an opening 496 coupled into a second side of the process region 404. The second external reentrant conduit 440' has a first end 440a' having an opening 494 coupled into a third side of the process region 404 and a second end 440b' having an opening 492 into a fourth side of the process region 404. In one embodiment, the first and second external reentrant conduits 440, 440' are configured to be orthogonal to one another, thereby providing the two ends 440a, 440a', 440b, 440b' of each external reentrant conduits 440, 440' disposed at about 90 degree intervals around the periphery of the top 426 of the chamber body 402. The orthogonal configuration of the external reentrant conduits 440, 440' allows a plasma source distributed uniformly across the process region 404. It is contemplated that the first and second external reentrant conduits 440, 440' may have other configurations utilized to control plasma distribution in the process region 404.

Magnetically permeable torroidal cores 442, 442' surround a portion of a corresponding one of the external reentrant conduits 440, 440'. The conductive coils 444, 444' are coupled to respective RF power sources 446, 446' through respective impedance match circuits or elements 448, 448'. Each external reentrant conduits 440, 440' is a hollow conductive tube interrupted by an insulating annular ring 450, 450' respectively that interrupts an otherwise continuous electrical path between the two ends 440a, 440b (and 440a', 404b') of the respective external reentrant conduit 440, 440'. Ion energy at the substrate surface is controlled by an RF bias generator 454 coupled to the substrate support assembly 428 through an impedance match circuit or element 456.

Process gases including gaseous compounds supplied from the process gas source 452 are introduced through the overhead gas distribution plate 430 into the process region 404. RF power source 446 is coupled from the power applicators, i.e., core and coil, 442, 444 to gases supplied in the conduit 440, which creates a circulating plasma current in a first closed torroidal path power source 446' may be coupled from the other power applicators, i.e., core and coil, 442', 444' to gases in the second conduit 440', which creates a circulating plasma current in a second closed torroidal path transverse (e.g., orthogonal) to the first torroidal path. The second torroidal path includes the second external reentrant conduit 440' and the process region 404. The plasma currents in each of the paths oscillate (e.g., reverse direction) at the frequencies of the respective RF power sources 446, 446', which may be the same or slightly offset from one another.

In operation, a process gas is provided to the chamber from the process gas source 452. Depending on the embodiment, the process gas may comprise inert or reactive gases to be ionized and directed toward the substrate 406. Virtually any gas that may be easily ionized can be used in the chamber 400 to practice embodiments of the invention. Some inert gases that may be used include helium, argon, neon, krypton, and xenon. Reactive or reactable gases that may be used include borane and its oligomers, such as diborane, phosphine and its oligomers, arsine, nitrogen containing gases, hydrogen containing gases, oxygen containing gases, carbon containing gases, and combinations thereof. In some embodiments, nitrogen gas, hydrogen gas, oxygen gas, and combinations thereof may be used. In other embodiments, ammonia and its derivatives, analogues, and homologues, may be used, or hydrocarbons such as methane or ethane may be used. In still other embodiments, halogen containing gases, such as fluorine or chlorine containing gases like $BF_3$, may be used. Any substance that may be readily vaporized, and that does not deposit a material substantially identical to the magnetically susceptible layer of the substrate, may be used to modify its magnetic properties through bombardment or implantation. Most hydrides may be used, such as silane, borane, phosphine, methane, and other hydrides. Also, carbon dioxide and carbon monoxide may be used.

The power of each RF power source 446, 446' is operated so that their combined effect efficiently dissociates the process gases supplied from the process gas source 452 and produces a desired ion flux at the surface of the substrate 406. The power of the RF bias generator 454 is controlled at a selected level at which the ion energy dissociated from the process gases may be accelerated toward the substrate surface and implanted at a desired depth below the top surface of the substrate 406 in a desired ion concentration. For example, with relatively low RF power, such as less than about 50 eV, relatively low plasma ion energy may be obtained. Dissociated ions with low ion energy may be implanted at a shallow depth between about 1 Å and about 100 Å from the substrate surface. Alternatively, dissociated ions with high ion energy provided and generated from high RF power, such as higher than about 50 eV, may be implanted into the substrate having a depth substantially over 100 Å depth from the substrate surface.

One example of a process chamber adaptable for performing methods described herein is the P3i™ plasma processing chamber available from Applied Materials, Inc., of Santa Clara, Calif.

In one example, a substrate having a magnetically susceptible surface was provided to a plasma immersion ion implantation chamber similar to the chamber described above in connection with FIG. 4. The magnetically susceptible surface was formed as an alloy layer of cobalt and platinum approximately 15 nm thick on a glass structural substrate. The magnetically susceptible surface exhibited a uniform initial magnetization of 0.5 kerr signal units and magnetic coercivity of 4,000 Oe.

An epoxy resist material was applied to the magnetically susceptible surface to a thickness of 60 nm and patterned using a nanoimprint lithography process. The resulting patterned resist layer had thick portions and thin portions. The thick resist portions were between 50 nm and 60 nm thick, and the thin resist portions were between 5 nm and 10 nm thick. The pattern formed in the resist material had critical dimension of 50 nm.

The substrate was subjected to a sputtering process to expose the magnetically susceptible layer underneath the areas of thin resist, and to remove a portion of the magnetically susceptible layer in those areas. A process gas of 5-8% argon in helium was provided to the chamber at 300 sccm, and the pressure in the chamber maintained at 15 mTorr. The process gas was ionized by application of an inductive magnetic field powered by 500 Watts of 13.56 MHz RF power. An RF bias of 7 kV was applied to the substrate support to direct the ions toward the substrate and sputter material from the substrate.

The foregoing process conditions were maintained for 20 seconds, removing the thin resist and up to 20 Angstroms of material from the exposed portions of the magnetically susceptible layer, and reducing the thickness of the thick resist areas by 20 nm. The critical dimension of the exposed areas was essentially unchanged by the sputtering process. The magnetically susceptible layer emerged with depressions approximately 2 nm deep in the exposed areas.

The chamber was then evacuated and a plasma immersion ion implantation process was performed on the substrate. A gas mixture of 30 sccm $BF_3$ and 100 sccm of 10% $B_2H_6$ in $H_2$ was provided to the chamber at a pressure of 20 mTorr or less for 40 seconds, and ionized as described above. An RF bias of 8 kV was applied to the substrate support.

The exposed areas of the magnetically susceptible layer were implanted with a dose of about $10^{17}$ $cm^{-3}$ of fluorine and boron atoms to a depth of 15 nm. Following the implantation, the depth of the depressions in the magnetically susceptible layer was reduced to less than 1 nm. The resist material was removed using a plasma ashing process, leaving a substrate with a pattern of magnetic properties. Regions of the substrate 50 nm in dimension had magnetization of about 0 kerr signal units and magnetic coercivity of about 0 Oe. The magnetic properties of the treated regions were eliminated, while the intervening regions, which were protected from the sputtering and implantation processes, were largely unaffected. The resulting substrate had average $R_a$ surface roughness of approximately 0.8 nm.

Use of a plasma immersion ion implantation process to planarize magnetic substrates provides a magnetically patterned substrate having a very smooth surface using a process compatible with magnetic patterning processes that involve ion implantation or plasma immersion ion implantation. The planarization process can be performed in the same chamber as the implantation and resist stripping processes, if desired, using the same patterned mask used for the patterning process. The embodiments described herein are also compatible with cooling and purging steps that may be performed while manufacturing magnetic media. Thus, the embodiments described herein, and the concepts they embody, promote efficient manufacturing of magnetic media having very small critical dimensions and very smooth surfaces.

While the foregoing is directed to certain embodiments, other and further embodiments may be devised without departing from the basic scope of the invention.

What is claimed is:

1. A method of processing a substrate having a magnetically susceptible layer comprising a magnetically susceptible material, wherein the magnetically susceptible layer is covered by a layer of patterned resist, the layer of patterned resist comprising a plurality of first portions having a first thickness and a plurality of second portions have a second thickness, wherein the second thickness is less than the first thickness, the method comprising:

removing the plurality of second portions of the resist and at least some of the magnetically susceptible material below the plurality of second portions of the resist by exposing the substrate to a material-removing plasma;

after exposing the substrate to the material-removing plasma, implanting ions into the magnetically susceptible material formerly covered by the plurality of second portions of resist subjecting the substrate to a plasma ion immersion implantation process; and after the plasma ion immersion implantation process, removing at least some of the layer of patterned resist not removed by the material-removing plasma by subjecting the substrate to a plasma resist removal process.

2. The method of claim 1, wherein removing the plurality of second portions of the resist and at least some of the magnetically susceptible material below the plurality of second portions of the resist comprises exposing the substrate to a directional material removal process.

3. The method of claim 2, wherein the directional material removal process comprises selectively removing material from surfaces parallel to the substrate.

4. The method of claim 1, wherein removing the plurality of second portions of the resist and at least some of the magnetically susceptible material below the plurality of second portions of the resist comprises exposing the substrate to a plasma immersion sputtering process.

5. The method of claim 4, wherein the plasma immersion sputtering process comprises providing an inert gas to a processing chamber containing the substrate, ionizing the inert gas, and directing the ions toward the substrate.

6. The method of claim 5, wherein the inert gas comprises argon.

7. The method of claim 1, wherein removing the plurality of second portions of the resist and at least some of the magnetically susceptible material below the plurality of second portions of the resist comprises exposing the substrate to a non-directional material removal process.

8. The method of claim 7, wherein the non-directional material removal process comprises providing a gas mixture comprising nitrogen to a processing chamber containing the substrate, ionizing the gas mixture, and directing the ions toward the substrate using an electrical bias.

9. The method of claim 1, wherein the plasma ion immersion implantation process substantially levels the magnetically susceptible layer.

10. The method of claim 1, wherein the plasma ion immersion implantation process implants ions that change at least one magnetic property of the magnetically susceptible material by between about 10% and about 100%.

* * * * *

UNITED STATES PATENT AND TRADEMARK OFFICE
CERTIFICATE OF CORRECTION

| | |
|---|---|
| PATENT NO. | : 8,673,162 B2 |
| APPLICATION NO. | : 12/965318 |
| DATED | : March 18, 2014 |
| INVENTOR(S) | : Gouk et al. |

Page 1 of 1

It is certified that error appears in the above-identified patent and that said Letters Patent is hereby corrected as shown below:

In the Claims:

Column 14, Claim 1, Line 49, insert --by-- after resist.

Signed and Sealed this
First Day of July, 2014

Michelle K. Lee
*Deputy Director of the United States Patent and Trademark Office*